United States Patent Office 3,414,371
Patented Dec. 3, 1968

3,414,371
LOW PRESSURE SYNTHESIS OF ELECTRICALLY CONDUCTIVE PLATINUM COBALT OXIDE FROM A PLATINUM HALIDE AND AN OXIDE CONTAINING COBALT
Donald B. Rogers, Carrcroft Crest, Wilmington, Del., assignor to E. I. du Pont de Nemours and Company, Wilmington, Del., a corporation of Delaware
No Drawing. Filed Jan. 31, 1967, Ser. No. 612,774
8 Claims. (Cl. 23—50)

ABSTRACT OF THE DISCLOSURE

Process for preparing an electrically conductive oxide of the formula $$Pt_{1+x}Co_{\frac{2-2x}{3}}O_4$$

where $x$ is 0.6–0.8, by reacting a platinum halide, particularly $PtCl_2$, with an oxidic reagent containing cobalt such as a cobalt oxide, alkali metal or rare earth cobaltate at 600—850° C. and autogenous pressure.

Field of the invention

This invention relates to platinum cobalt oxide, and more particularly to an improved method for its preparation.

Prior Art

A new electrically conductive platinum cobalt oxide which can be represented by the formula $Pt_xCo_yO_2$, where $x$ and $y$ are $0.8\pm0.12$ and the sum of $x$ and $y$ is less than 1.70, and which has a crystal structure based on the rhombohedral space group $\overline{R3}m$ with cell edge $$a = 6.164 \pm 0.05 \text{ A.}$$

and the rhombohedral angle $\alpha = 26°34'$ (based on a hexagonal cell $a = 2.831 \pm 0.05$ A. and $c = 17.83 \pm 0.10$ A.) is described in U.S. application Ser. No. 612,775, filed concurrently as a continuation-in-part of U.S. application Ser. No. 561,336, filed June 29, 1966 by R. D. Shannon. This oxide is of particular utility in electrical resistance elements. The methods for preparing this oxide as described in the above-mentioned applications involve the use of high pressures, e.g., 50–3000 atmospheres.

Summary and detailed description

It has now been found that the electrically conductive platinum cobalt oxide of the crystal structure defined above can be prepared by a process which does not require the application of high pressures and thus can be done in less expensive equipment. The process of this invention involves the preparation of platinum cobalt oxide having the crystal structure defined above and having the formula $$Pt_{1+x}Co_{\frac{2-2x}{3}}O_4$$

where $x$ is 0.6–0.8, by reaction of a platinum halide, e.g., $PtCl_2$, with an oxidic reagent containing cobalt such as the cobalt oxides, e.g., CoO and $Co_3O_4$, and the alkali metal and rare earth cobaltates, e.g., $LiCoO_2$ and $LaCoO_3$, at a temperature of 600–850° C. under autogenous pressure in a sealed reaction vessel. Preferably, the reaction is caried out at 700–750° C. with the oxidic reagent being one containing trivalent cobalt. Optionally, the oxidic reagent can be a mixed cobalt oxide or a mixture of cobalt oxides containing both divalent and trivalent cobalt. The divalent cobalt oxide CoO is effective in exchanging oxygen for the halide ions liberated in the reaction.

One embodiment of the process of this invention involves the metathesis between a platinum halide and the cobalt oxides $Co_3O_4$ and CoO in accordance with the following equation:

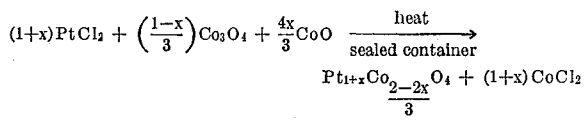

where the values of $x$ can vary from 0.6 to 0.8. Equivalent quantities of reagents containing trivalent cobalt are used to obtain the highest phase purity in this process. When reactant compositions for which the values of $x$ are less than 0.6 or greater than 0.8 are employed, some of the desired hexagonal platinum cobalt oxide is formed, but the reaction mixture also contains excess $Co_3O_4$, metallic platinum, or other phases.

Another embodiment of the process of this invention involves the metathesis of a platinum halide and a mixed alkali metal-cobalt oxide containing trivalent cobalt, e.g., $LiCoO_2$. This reaction takes place according to the following equation:

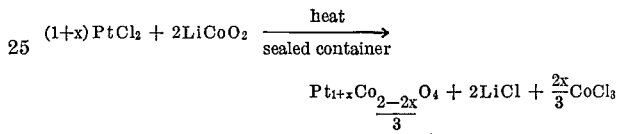

As in the preceding embodiment, reaction mixtures in which the values of $x$ range between 0.6 and 0.8 give the desired hexagonal platinum cobalt oxide in highest purity.

Another embodiment of the process involves metathesis of a platinum halide and a mixed rare earth-cobalt oxide, or rare earth cobaltate, e.g., $LaCoO_3$. This reaction takes place in accordance with the following equation:

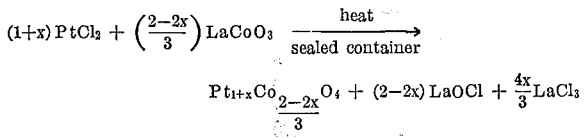

As in the previous embodiments, proportions of reactants that correspond to values of $x$ ranging from 0.6–0.8 give the desired hexagonal cobalt oxide in highest purity.

In still another embodiment, the platinum halide can be reacted with cobaltous oxide, CoO, alone. This reaction takes place with formation of hexagonal platinum cobalt oxide that is always contaminated with other phases.

The process of this invention is conveniently carried out by placing a mixture of the particular reactants in the proportions indicated above into an inert reaction vessel capable of withstanding the reaction conditions to be used, e.g., a platinum tube or a silica tube. The air in the reaction tube is then removed by suitable means. In the case of the platinum reaction tube, the charged tube is crimped along its length to expel air and the ends are then welded shut. In the case of a silica reaction vessel, the charged tube is evacuated to remove air and then sealed shut. The reaction tube is then heated to the desired temperature of 600–850° C., and preferably at 700–750° C., by conventional means, e.g., an electric furnace, for periods of time ranging from 16 to 36 hours or more. After heating is completed, the reaction vessel is cooled, opened, and the crystalline reaction product is removed. The product is leached in water to remove $CoCl_2$, or other byproducts, and the leached product is then washed with acetone and dried in air.

The platinum halides that can be used in the above process include $PtF_2$, $PtCl_2$, $PtBr_2$ and $PtI_2$. The oxidic reagents containing cobalt that can be used in the process include $Co_3O_4$; mixed alkali metal-cobalt oxides (alternatively named alkali metal cobaltates) of the formula $MCoO_2$, where M is an alkali metal, e.g., $LiCoO_2$, $NaCoO_2$, or $KCoO_2$; mixed rare earth-cobalt oxides (alternatively named rare earth cobaltates) of the formula $M'CoO_3$, where M' is a rare earth of atomic number 57–64, inclusive, e.g., $LaCoO_3$, $PrCoO_3$, $NdCoO_3$, $SmCoO_3$ and $GdCoO_3$, and cobaltous oxide, CoO. The commercialy available grades of these reagents can be used in the process of this invention, but it is preferable to use grades of highest purity.

The process is illustrated in further detail in the following examples.

Example 1

A mixture of 0.4524 g. of $PtCl_2$, 0.2048 g. of $Co_3O_4$, and 0.0637 g. of CoO (that has been mixed by hand with an agate mortar and pestle) is placed in a platinum tube 3½″ long and ⅜″ in diameter. These quantities are in the proportions required by the formula $$Pt_{1+x}Co_{\frac{2-2x}{3}}O_4$$

when $x$ is 0.6. The platinum tube is crimped along its length to expel air and is sealed by welding. After heating in an electric furnace for 36 hours at 750° C., the tube is cooled and opened. A highly crystalline product is obtained that is gray in color with a metallic luster and that possesses a plate-like habit. After leaching in water to remove $CoCl_2$, the crystallites are washed in acetone and air-dried. The X-ray diffraction pattern of the pulverized product shows the material to have the same rhombohedral structure as $CuFeO_2$. The crystals belong to the space group $R\bar{3}m$ with cell edge $a=6.164$ A. and the rhombohedral angle $\alpha=26°\ 34'$ (based on a hexagonal cell, $a=2.831$ A., $c=17.83$ A.). Density measurements of the polycrystalline sample indicate a density of about 11.2 g./cc.

Example 2

A mixture of 0.4523 g. of $PtCl_2$, $Co_3O_4$, and 0.0637 g. of CoO (equivalent quantities corresponding to $Pt_{1.6}Co_{1.6}O_4$) is placed in a tube of fused silica ⅜″ in diameter and about 4″ long. The tube is evacuated and sealed under vacuum. The sealed tube is heated overnight (about 16 hours) at 700° C. in an electric furnace. After heating is completed, the tube is cooled and opened. The resulting reaction product appears visually to be the same as that obtained in Example 1. After leaching with water as in Example 1, the product gives an X-ray diffraction pattern identical with that given by the product of Example 1.

Example 3

The procedure described in Example 2 is repeated with the single exception that a sealed platinum tube is used as the reaction vessel. The product of this experiment possess the same nominal composition and phase purity as the product of Example 2. The product of this example is combined with that of Example 2 to provide a composite sample amounting to about 3 g. Chemical analysis of the composite product gives the following results (expressed as weight percent): Pt, 66.64%; Co, 21.17%; O, 12.10, 12.99 and 12.91%. These results are within probable analytical error of those calculated for the nominal composition $Pt_{1.6}Co_1V_6O_4$.

Example 4

A mixture of 0.1695 g. of $PtCl_2$, 0.950 g. of $Co_3O_4$, and 0.0182 g. of

CoO ($x=0.4$ in the formula $Pt_{1+x}Co_{\frac{2-2x}{3}}O_4$)

is reacted as described in Example 2. After leaching in water to remove $CoCl_2$, the product is subjected to X-ray diffraction analysis and the pattern obtained indicates hexagonal platinum cobalt oxide plus a small amount of $Co_3O_4$.

Example 5

A mixture of 0.1909 g. of $PtCl_2$, 0.0704 g. of $Co_3O_4$, and 0.0319 g. of

CoO ($x=0.8$ in $Pt_{1+x}Co_{\frac{2-2x}{3}}O_4$)

is reacted under the conditions disclosed in Example 2. An X-ray diffraction pattern of the leached product indicates hexagonal platinum cobalt oxide with no excess platinum and no excess $Co_3O_4$.

Example 6

A mixture of 0.7056 g. of $PtCl_2$ and 0.6388 g. of $Co_3O_4$ ($x=0$ in the formula $Pt_{1+x}Co_{\frac{2-2x}{3}}O_4$)

is reacted under the conditions described in Example 1. The crystalline product obtained contains the desired hexagonal, platinum cobalt oxide phase contaminated with $Co_3O_4$, as indicated by X-ray diffraction analysis.

Example 7

A mixture of 0.4624 g. of $PtCl_2$, 0.1542 g. of $Co_3O_4$, and 0.0823 g. of

CoO (which corresponds to $x=0.9$ in $Pt_{1+x}Co_{\frac{2-2x}{3}}O_4$)

is reacted at 750° C. for 36 hours as described in Example 1. The crystalline product obtained contains the desired hexagonal platinum cobalt oxide phase contaminated with platinum.

Example 8

A mixture of 0.2335 g. of $PtCl_2$ and 0.1039 g. of $LiCoO_2$ (corresponding to $x=0.6$ in the formula $Pt_{1+x}Co_{\frac{2-2x}{3}}O_4$)

is sealed into an evacuated silica tube as described in Example 2. The closed tube is then heated at 750° C. for 24 hours. After cooling, the tube is opened. The reaction product is leached with water, and there is obtained approximately 0.25 g. of polycrystalline hexagonal platinum cobalt oxide. The X-ray diffraction pattern exhibited by this product is identical to those obtained on the products of the preceding examples. No other phases are present.

Example 9

A mixture of 0.2262 g. of $PtCl_2$ and 0.2090 g. of $LaCoO_3$ (quantities corresponding to $x=0.6$ in the formula $Pt_{1+x}Co_{\frac{2-2x}{3}}O_4$)

is heated in an evacuated, sealed silica tube at 700° C. as described in Example 2. The reaction product is leached in dilute aqueous HCl, washed in acetone, and air-dried. X-ray diffraction analysis of the resulting product indicates that the hexagonal platinum cobalt oxide is the primary phase present, but it is contaminated with LaOCl.

Example 10

A mixture of 0.4650 g. of $PtCl_2$ and 0.2620 g. of CoO is heated in a sealed platinum tube under conditions similar to those described in Example 1. The reaction product contains hexagonal platinum cobalt oxide, as shown by X-ray diffraction, contaminated with Pt and $Co_3O_4$.

The platinum cobalt oxide prepared by the process of this invention is useful as a component in ceramic electrical resistor compositions as described in the aforementioned application Ser. No. 612,775 filed concurrently by R. D. Shannon. The use of platinum cobalt oxide made by the process of this invention in electrical resistor compositions and the application of such compositions to a ceramic dielectric base are illustrated below.

Finely divided platinum cobalt oxide, prepared by the procedure described in Example 1, is mixed with powdered (ball-milled) glass of the following composition: $SiO_2$, 25% by weight; PbO, 65%; and $B_2O_3$, 10%; and liquid organic medium consisting of 90% of β-terpineol and 10% of low viscosity ethyl cellulose in the proportions listed in the following table to form a paste with a solid-to-liquid ratio of 2:1. The compositions are screen printed on small alumina plates and the coated plates are then fired with a 45-minute firing cycle at a 760° C. peak temperature, to produce electrical resistors. The resistors are mechanically strong and exhibit the sheet resistivities and thermal coefficients of resistance (TCR) summarized in the following table:

TABLE.—ELECTRICAL RESISTORS CONTAINING PLATINUM COBALT OXIDE

| Resistor No. | Particle size of oxide | Solids composition, percent by weight | | Sheet resistivity, ohms/sq. | Thermal coefficient of resistance, p.p.m./° C. |
|---|---|---|---|---|---|
| | | Oxide | Glass | | |
| 1 | −200+325 mesh | 90 | 10 | 21 | 890 |
| 2 | do | 80 | 20 | 12 | 1,300 |
| 3 | do | 70 | 30 | 17 | 1,480 |
| 4 | do | 60 | 40 | 220 | 670 |
| 5 | −325 mesh | 90 | 10 | 15 | 290 |
| 6 | do | 80 | 20 | 14 | 640 |
| 7 | do | 70 | 30 | 12 | 930 |
| 8 | do | 60 | 40 | 21 | 870 |
| 9 | do | 50 | 50 | 102 | 680 |

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing an electrically conductive platinum cobalt oxide which comprises reacting,
   at a temperature in the range 600–850° C. and at autogenous pressure in a sealed reaction vessel,
   a platinum halide, and
   at least one oxidic reagent of the group consisting of cobalt oxides, alkali metal cobaltates and rare earth metal cobaltates.

2. The process of claim 1 wherein the temperature is in the range 700–750° C.

3. The process of claim 1 wherein platinum chloride is used.

4. The process of claim 1 wherein the oxidic reagent contains trivalent cobalt.

5. The process of claim 1 wherein a mixture of $PtCl_2$, $Co_3O_4$ and CoO is reacted together.

6. The process of claim 1 wherein in a mixture of $PtCl_2$ and $LiCoO_2$ is reacted together.

7. The process of claim 1 wherein a mixture of $PtCl_2$ and $LaCoO_3$ is reacted together.

8. The process of claim 1 wherein a mixture of $PtCl_2$ and CoO is reacted together.

No references cited.

OSCAR R. VERTIZ, *Primary Examiner.*

H. T. CARTER, *Assistant Examiner.*

UNITED STATES PATENT OFFICE
CERTIFICATE OF CORRECTION

Patent No. 3,414,371                          December 3, 1968

Donald B. Rogers

It is certified that error appears in the above identified patent and that said Letters Patent are hereby corrected as shown below:

Column 1, lines 16 and 17, and lines 57 to 59, column 2, lines 7 to 9, 26 to 28, and 40 to 42, column 3, lines 20 to 22, and 68 to 70, column 4, lines 4 to 6, 14 to 16, 25 to 27, 35 to 37, and 50 to 52, the expression should appear as shown below:

$$Pt_{1+x}Co_{2-\frac{2x}{3}}O_4$$

Column 2, lines 5 and 6, $\left(\frac{1-x}{3}\right)$          should read          $\left(\frac{1-x}{3}\right)$ same column 2, lines 36 and 37, $\left(\frac{2-2x}{3}\right)$          should read          $\left(\frac{2-2x}{3}\right)$ Column 3, line 39, after "$PtCl_2$" insert -- 0.2047 g. of --; line 63, "$Pt_{1.6}Co_1V_6O_4$" should read -- $Pt_{1.6}Co_{1.6}O_4$ --.

Signed and sealed this 17th day of March 1970.

(SEAL)
Attest:

EDWARD M. FLETCHER, JR.                      WILLIAM E. SCHUYLER, JR.
Attesting Officer                             Commissioner of Patents